April 9, 1957

J. ROSAN 2,787,796

METHOD OF CONVERTING STANDARD THREADS INTO LOCKING THREADS

Filed Sept. 30, 1952

INVENTOR.
Joseph Rosan
BY
Lyon + Lyon
ATTORNEYS

April 9, 1957 J. ROSAN 2,787,796
METHOD OF CONVERTING STANDARD THREADS
INTO LOCKING THREADS
Filed Sept. 30, 1952 2 Sheets-Sheet 2

INVENTOR.
Joseph Rosan
BY
Lyon & Lyon
ATTORNEYS

United States Patent Office 2,787,796
Patented Apr. 9, 1957

2,787,796

METHOD OF CONVERTING STANDARD THREADS INTO LOCKING THREADS

Joseph Rosan, Newport Beach, Calif.

Application September 30, 1952, Serial No. 312,231

4 Claims. (Cl. 10—86)

This invention relates to screw threads, and more particularly, to a method and apparatus for modifying or converting either a standard male or a standard female thread into a thread that will lock with an unmodified standard mating thread of the corresponding diameter and pitch and positively hold the threaded parts against loosening under extreme conditions of vibration, temperature changes, etc.

The present invention is related to the subject-matter disclosed in my copending application Serial No. 309,960, filed September 17, 1952. That application discloses specially threaded elements adapted to be used in lieu of conventional bolts, nuts, etc., and constructed so that when the specially threaded element is screwed into a conventional threaded element, the thread of the conventional element is deformed in a manner to cause it to be locked to the specially threaded element. In contrast, the present invention relates to a method and tools for modifying nuts, bolts, etc., having a standard thread in order to produce a similar locking effect between a modified standard thread and a corresponding mating standard thread, whereby to impart to such standard threaded bolts and nuts the same locking properties that are attained with a standard threaded part and a specially threaded part, as disclosed in said copending application.

The principal object of the invention is to provide a method and tools whereby threaded parts which are normally devoid of locking means can be readily modified to convert the threads thereof into positive, self-locking threads for preventing rotation of the modified threaded part with respect to either a part provided with a standard mating thread, or a part having a standard mating thread which has also been modified in accordance with the principles of the invention.

Another object of the invention is to modify the crown of a conventional thread on one or both of a pair of threaded members in such a manner that an effective lock is established between a member having a modified standard thread and a member having an unmodified standard thread, or between two members both having modified standard threads, so that the two parts can be threaded together into locked relation without setting up high stresses that would produce galling on the flanks of the threads, and without contributing to early failure or fatigue of the thread members.

This is accomplished by enlarging or expanding the crest or crown of the standard thread to an extent greater than the normal thread clearance for that particular type of thread, in order to effect interfering locking-engagement of the modified thread with a standard or similarly modified thread. The interfering engagement and the consequent force or torque required to unthread the members can be varied by altering the character and degree of distortion of the thread crown. That is to say, by varying the extent to which the width and/or diameter of the crown is increased beyond its original dimensions. When the standard threads on both members are modified, the locking effect is obviously much greater than when only one thread is modified.

Another object of the invention is to provide tools for deforming the crown of male and female threads by impressing a groove in the crown substantially medially of the crown to thereby displace the metal at the crown to widen the crown beyond its normal width and/or increase the diameter of the crown beyond its normal size, whereby the enlarged portions of the crown can frictionally engage with the flanks and/or root of a mating thread to lock the threads together. In the case of a female thread, the thread thereof is modified by the simple expedient of threading a tool into the female thread which is specially designed to displace metal in a desired manner at the crown of the female thread, without cutting metal from the crown. In the case of a male thread, the crown is modified by mounting the threaded member in a lathe and engaging the crown by a suitable thread rolling tool. In either case, the crown is widened and/or increased in diameter to provide interfering engagement by causing lateral and/or radial flow and distortion of the crown to convert it into a locking thread.

A further object of the invention is to increase the utility of members already in existence and provided with conventional threads by modifying the threads of one or both of a pair of members having mating threads in order to provide a positive locking action between the threads not obtainable with the threads in their initial conventional form.

While the invention in its broader aspects may be employed with any one of a large number of standard or conventional thread forms, the present invention will be described in connection with an American National thread of well-known, conventional form. Such threads are V-shaped with a 60° included angle between the flanks of adjacent threads, and in Class 3 threads in this system the dimensional tolerances are such that the flanks of the mating threads may have clearance, but not interference. Also, the crowns or crests of the male and female threads are truncated. The modified thread of the present invention is obtained by deforming the crowns of the conventional truncated surface, to provide interference adjacent the root of the mating thread. The principles of the invention are equally applicable to parts formed of either ferrous or non-ferrous metals, for example, steel and aluminum alloys.

Other objects and features of the invention will be apparent from the following description taken in conjunction with the accompanying drawings, in which.

Figure 1:
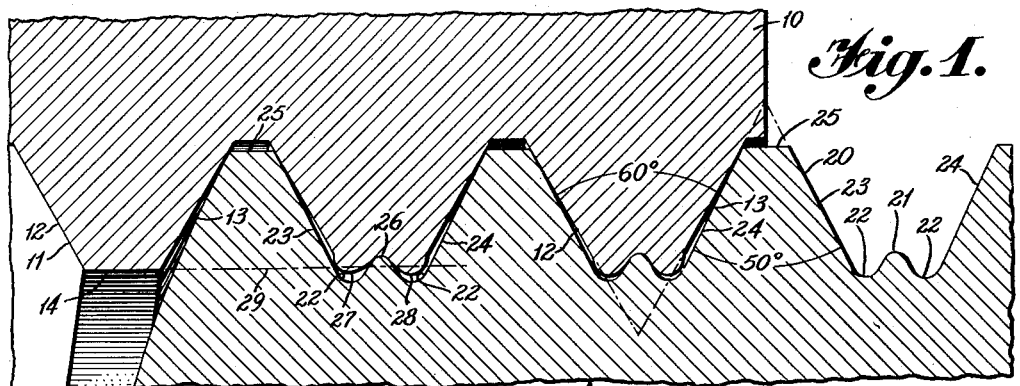
Fig. 1 is a sectional view showing a fragment of a member provided with a standard female thread and a fragment of a tool for deforming the crown of such female thread.

Referring to Fig. 1 of the drawings, a fragment of a nut 10 is shown provided with a standard or conventional internal thread 11, and, as illustrated, this thread may comprise an American National, Class 3 thread, of conventional V-shaped configuration. It will be understood that the thread 11 could be present in a hole or opening in any member, and that the nut 10 has been shown merely by way of illustration and not limitation. The thread 11 has flanks 12 and 13 with a 60° included angle therebetween, the crown 14 being truncated and normally having a smooth cylindrical surface. Since the thread 11 is conventional, it would not ordinarily positively, lockingly engage with a standard bolt, stud, etc. having threads of a corresponding diameter and pitch. Therefore, in order to impart locking properties to the thread 11, the crown 14 is modified according to the present invention to increase its width and/or diameter by a hard, smoothly ground and burnished tool 16, a fragment only of which is shown in Fig. 1.

Figure 2:
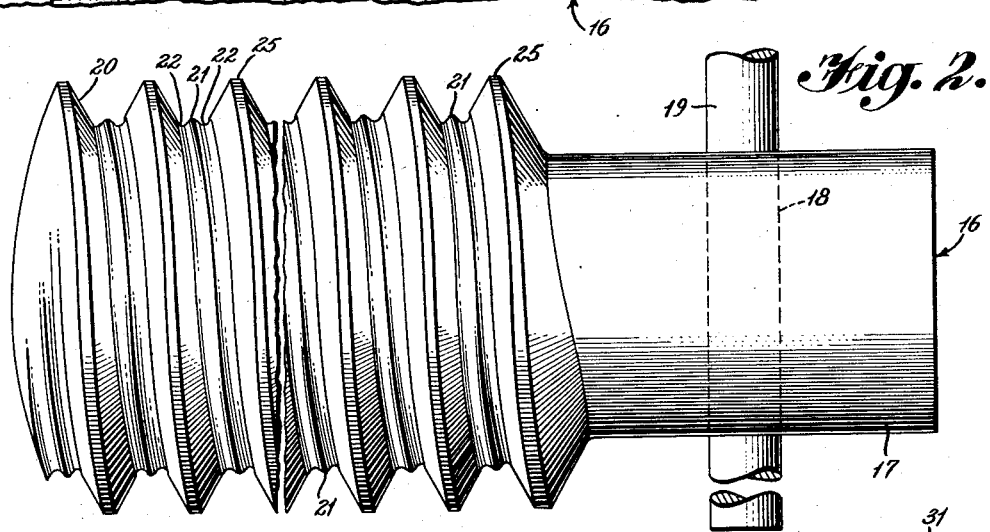
Fig. 2 is a view of the complete tool.

The complete tool 16 is shown in Fig. 2 and comprises a shank 17 having a passageway 18 extending therethrough and a bar 19 disposed in the passageway 18 to facilitate turning of the tool manually. The tool 16 further comprises a generally cylindrical portion, of a suitable length and a diameter larger than the shank 17, provided with a main helical thread 20 on the exterior thereof, the thread 20 having a diameter and pitch corresponding to that of the thread 11. However, the root of the thread 20, instead of being cylindrical and plain, has a second thread or ridge 21 formed between the convolutions of the main thread 20. The ridge 21 is symmetrical in cross section and is rounded at its crest, as best shown in Fig. 1. The ridge 21 is further characterized by the presence of arcuate fillets 22 formed on either side of the ridge 21 and serving to merge the ridge with the adjacent flanks 23 and 24 of the main thread 20. The thread 20 has a plain crown 25 and the flanks 23 and 24 are relieved inwardly of the crown so that the included angle between the flanks 23 and 24 is about 50°. The relieving of the flanks 23 and 24 and the provision of the fillets 22 provides the clearance space necessary to receive the metal displaced from the crown 14 of the thread 11 when the tool 16 is threaded into the nut 10 to perform the modifying operation on the thread 11. The height of the ridge 21 may be varied so that the height of the thread 11 is about 3½ to 7 times the height of the ridge 21, depending upon the extent of deformation to be imparted to the thread 11 to provide a given resistance to rotation.

As a specific example, a ⅜" diameter standard nut and bolt has 16 threads to the inch, and a clearance of about .00075 of an inch between the confronting flanks of the mating threads, or a total clearance of .0015 of an inch for each thread. In order to provide a positive lock, the crown of the thread 11 is distorted or expanded to an amount equal to about twice the total normal clearance, or about .003 of an inch. This provides a total excess of .0015 of an inch of metal on the threads 11 to bind or be displaced back toward normal in effecting the lock. The same principle of distorting the thread to twice the total normal clearance applies also to the root clearance, in instances where locking engagement between the periphery of the crown of the thread 11 and the root of the mating thread is desired. The ridge 21 and the fillets 22 may be varied in shape and/or size to provide the desired flank and/or root interference.

As the tool 16 is threaded into the nut 10, the main thread 20 thereof engages with the thread 11 to feed the tool through the nut. As the tool 16 is rotated, the ridge 21 is forced into the medial portion of the crown 14 exerting pressure in a direction perpendicular to the axis of the thread 11, thereby forming a substantially central groove 26 in the crown and displacing the metal of the crown laterally in both directions, and also inwardly, to form the rounded or bulbous enlargements 27 and 28, which are localized at either side edge of said crown. The deformation of the crown 14 widens the crown beyond its original dimension and also increases the height of the thread 11 beyond its original height. As previously indicated, the relieved flanks 23 and 24 and the fillets 22 provide the necessary clearance space to accommodate the lateral and radial expansion of the crown represented by the portions 27 and 28. The dot and dash line 29 in Fig. 1 constitutes a projection of the unmodified crown 14 to graphically emphasize the expansion which is effected by the action of the tool 16 on the crown 14.

Figure 3:
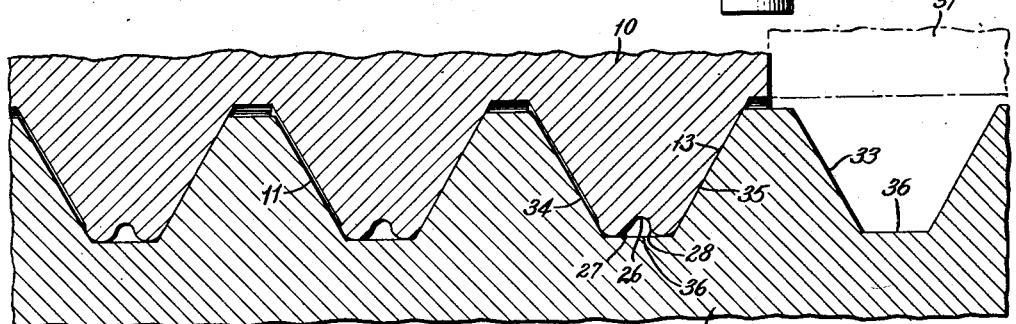
Fig. 3 is an enlarged fragmentary sectional view of the modified female thread of Fig. 1 mounted upon a member having a standard male thread of corresponding size.
Figure 4:
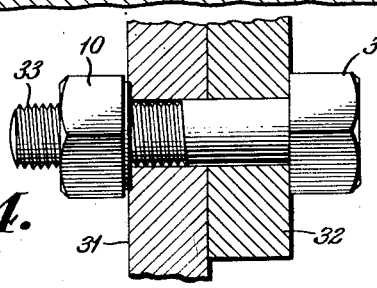
Fig. 4 is a view partly in section but showing, in elevation, a standard bolt extending through two parts and having a modified nut threaded thereon for securing said two parts together.

Fig. 4 shows the nut 10 mounted upon a standard bolt 30 extending through a pair of plates 31 and 32. Fig. 3 shows a fragment of the nut 10 and a fragment of the bolt 30 to an exaggerated scale to illustrate the manner in which the standard thread 33 of the bolt is locked with the modified thread 11 of the nut. Thus, it will be apparent that an interference fit is provided between the portions 27 and 28 of the modified thread 11 and the adjacent flanks 34 and 35 of the standard thread 33. The distortion which occurs in the crown 14 to provide the portions 27 and 28 is substantially symmetrical, as indicated in Fig. 1, so that as the standard male thread 33 is threaded into the modified female thread 11 and the nut 10 is drawn up tightly, the flank 13 of the female thread engages with the flank 35 of the male thread and the portion 28 tends to be displaced toward the groove 26 and toward the root 36 of the male thread to frictionally engage therewith. The portion 27, on the other hand, frictionally engages the adjacent flank 34 of the male thread 33 so that frictional engagement between the standard male and modified female threads occurs between the adjacent flanks of both threads. The clearances are exaggerated in Fig. 3 to facilitate illustration of the principles involved.

The crown 14 may be distorted to an extent to provide an interference fit only with the flanks of the bolt thread, without providing an interference fit with the root, or vice-versa. However, as shown in Fig. 3, the displaced portions 27 and 28 provide locking engagement with the flanks 34 and 35 of the bolt 33 and also provide locking engagement with the root 36 of the bolt thread.

The tool 16 is particularly useful for modifying the threads of stud holes in engine blocks or other machine parts, since the tool can be readily threaded into the stud openings without requiring removal of the parts to a special machine. However, if small parts, such as nuts, plates, etc. having holes provided with standard threads, are to be reworked to convert the thread thereof into a locking thread, then the bar 19 can be removed from the tool 16 and the shank thereof mounted in a suitable chuck and the tool power-operated to modify the threads in a manner similar to that of a tap. In addition, the tool 16 can be used to "recondition" a modified thread that has lost some of its effectiveness through numerous removal and reassembly operations.

Figure 5:
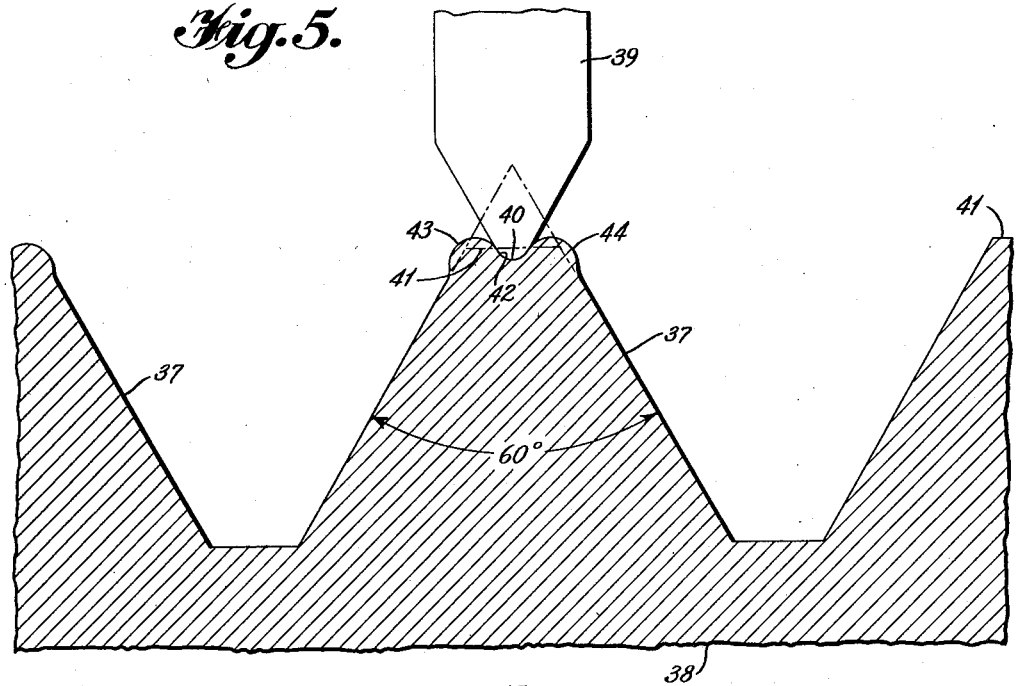
Fig. 5 is an enlarged view illustrating the male thread and a rolling tool for distorting or modifying the crown of the male thread.
Figure 6:
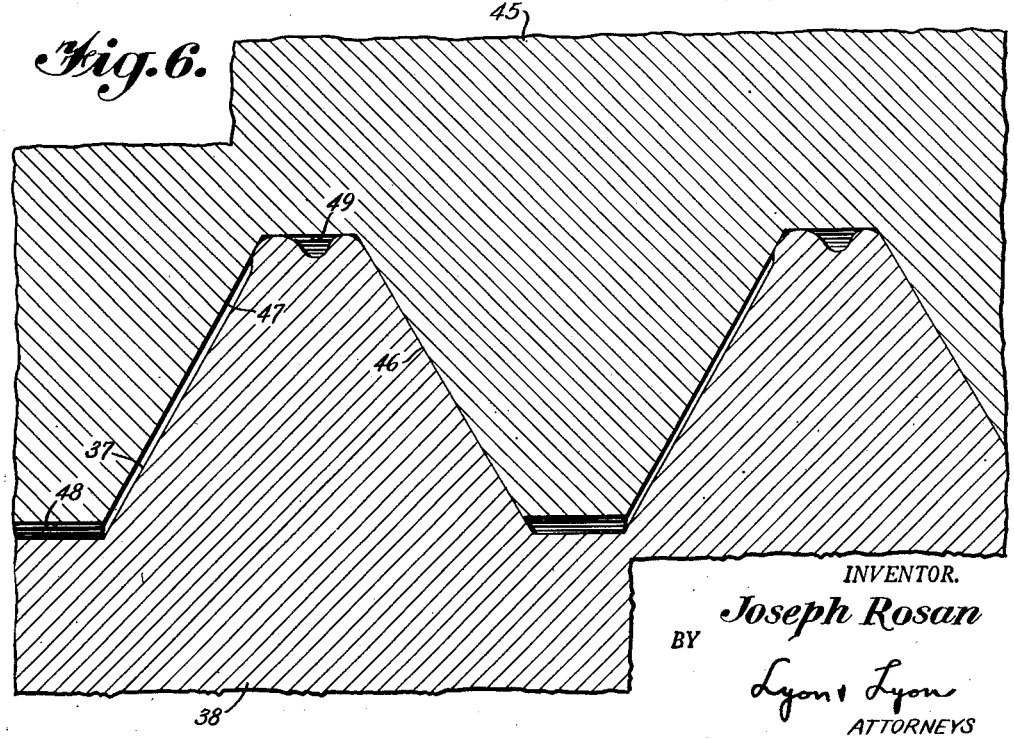
Fig. 6 is a fragmentary sectional view showing the modified male thread of Fig. 5 in operative relation to a standard female thread of corresponding size.

Fig. 5 is an enlarged view illustrating the manner in which the thread 37 of a standard bolt 38 (or any other part) may have the crown thereof modified by a rolling tool 39 having a rounded ridge 40. The bolt 38 is preferably mounted in a lathe (not shown) and the rolling tool mounted on a carriage (not shown), adjusted so that the ridge 40 of the tool 39 engages the central portion of the crown 41 of the thread to apply pressure to the crown in a direction perpendicular to the axis of the thread 37 and thereby form a groove 42 and displaced portions 43 and 44 similar to the groove 26 and displaced portions 27 and 28 formed on the female thread 11. The crown 41 of the bolt thread 37 is thus distorted and adapted to be engaged in the same manner as the modified crown of the thread 11. Here again, the extent of the distortion of the bolt thread 37 can be varied depending upon the adjustment of, and the pressure applied by, the rolling tool 39 to vary the width and diameter of the crown of the modified thread. When a standard nut 45, only a fragment of which is shown in Fig. 6, is threaded on the modified bolt thread 37, interference to rotation is developed between the enlarged portions 43 and 44 of the crown 41 and the flanks 46 and 47 of the nut thread 48 adjacent the root 49 of said nut thread, so that a positive locking action is attained between the two threads 37 and 48 in the same manner described in connection with Fig. 3.

Thus, conventional threaded parts such as the nut 10 and the bolt 38, which normally have no locking action other than that caused by the friction between the flanks of the conventional threads, can readily be modified by use of the tools 16 and 39 disclosed herein to alter the threads in a simple manner within the skill of even an untrained worker, to impart positive locking characteristics to such parts to enhance their utility and to enable such parts to be used under conditions of vibration, etc., for which they would normally be unsuited.

While reference has been made hereinbefore to the use of a part having a standard thread with another part having a corresponding, but modified, standard thread, it is to be understood that male and female threaded parts both having their threads modified in accordance with the principles of the invention may be threaded together to obtain the combined advantage of the locking threads on both the male and female members.

It is to be understood that variations may be made in the contour of the deformed threads and in the tools used to form such threads without departing from the principles of the invention or the scope of the annexed claims.

I claim:

1. The method of converting the thread on a member having a standard thread with a truncated crown into an automatically locking thread cooperable with an unmodified mating thread of another member having a standard thread of corresponding size, comprising the step of: applying force to the truncated crown of the thread in a direction transverse to the axis of the thread at a point about medially of the width of the crown to modify the shape of the crown by displacing the metal thereof laterally and radially sufficiently to increase the width and radial height of the thread at the crown and by an amount greater than the normal clearance that said standard thread would have with an unmodified standard mating thread, whereby when another threaded member having a corresponding mating standard but unmodified thread is brought into threaded engagement with the modified thread, the expanded portion of the modified thread will frictionally bind against the unmodified thread and lock the threads together.

2. The method of converting a standard thread into a locking thread, as defined in claim 1, in which the crown of the truncated thread is displaced to increase the width thereof by an amount approximately twice that of the normal clearance for a given size of standard thread.

3. The method of converting a standard thread having flanks and a truncated crown on one member, into a locking thread cooperable with an unmodified mating standard thread of corresponding size on another member, comprising the steps of: applying sufficient radial force to the truncated crown of the thread of said one member at a point intermediate the side edges of said crown to laterally displace the metal of the crown and form bulbous enlargements localized at either side edge of said crown to increase the width of the thread at said crown by an amount greater than the normal clearance for said size of standard thread, while preserving substantially the original shape of the flanks of the thread inwardly of said crown, so that when another member having a corresponding standard unmodified thread is engaged with the modified thread, the enlargements will frictionally bind against the adjacent flanks of the unmodified thread and lock the members together.

4. The method of converting a standard thread having flanks and a truncated crown on one member into a locking thread cooperable wtih an unmodified mating standard thread of corresponding size on another member, comprising the steps of: forming a groove of sufficient depth in the truncated crown of the thread of said one member at a point intermediate the side edges of said crown to laterally displace the metal of the crown and form bulbous enlargements localized at either side edge of said crown, to increase the width of the thread at said crown by an amount greater than the normal clearance for said size of standard thread, and without decreasing the radial height of said thread at the side edges of said crown, so that when another member having a corresponding standard unmodified thread is engaged with the modified thread, the enlargements will frictionally bind against the adjacent flanks of the unmodified thread and lock the members together.

References Cited in the file of this patent

UNITED STATES PATENTS

| | | |
|---|---|---|
| 658,085 | Higbee | Sept. 18, 1900 |
| 793,824 | Culliney | July 4, 1905 |
| 1,369,156 | Woodward | Feb. 22, 1921 |
| 1,451,484 | Woodward | Apr. 10, 1923 |
| 2,109,778 | Meersteiner | Mar. 1, 1938 |
| 2,177,100 | Frome | Oct. 24, 1939 |
| 2,301,679 | Bouget | Nov. 10, 1942 |
| 2,354,810 | Haas | Aug. 1, 1944 |
| 2,371,365 | Tomalis et al. | Mar. 13, 1945 |
| 2,429,832 | Luce | Oct. 28, 1947 |
| 2,454,444 | Poupitch | Nov. 23, 1948 |
| 2,556,174 | Evans | June 12, 1951 |
| 2,581,690 | Moehle | Jan. 8, 1952 |